July 21, 1970 P. L. FLEMING 3,521,243
FREQUENCY MEMORY USING A GUNN-EFFECT DEVICE IN A FEEDBACK LOOP
Filed Aug. 1, 1968 4 Sheets-Sheet 1
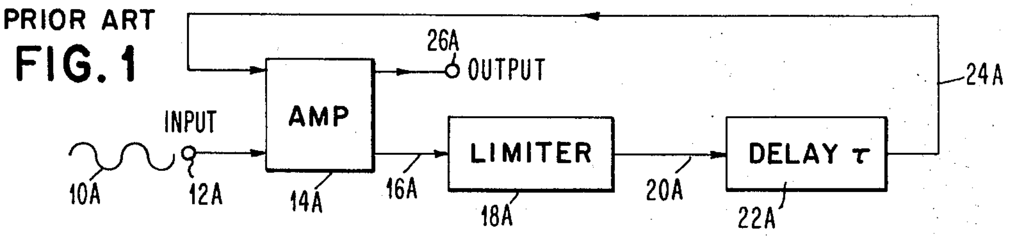
PRIOR ART FIG. 1
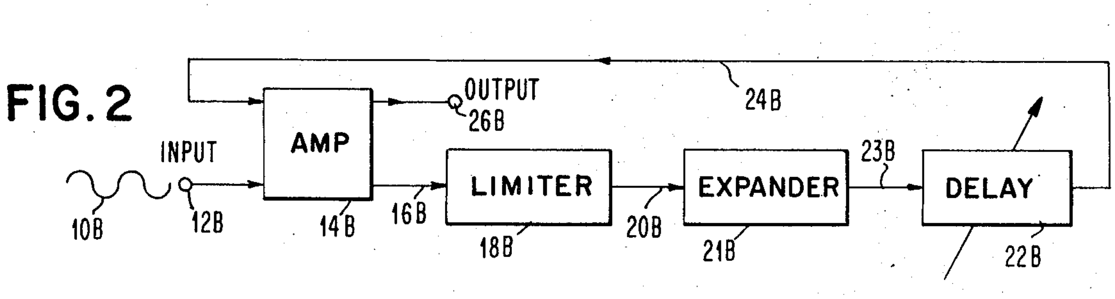
FIG. 2
FIG. 3B
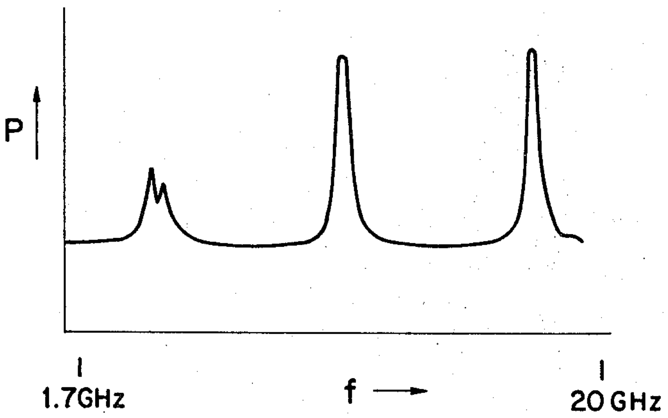
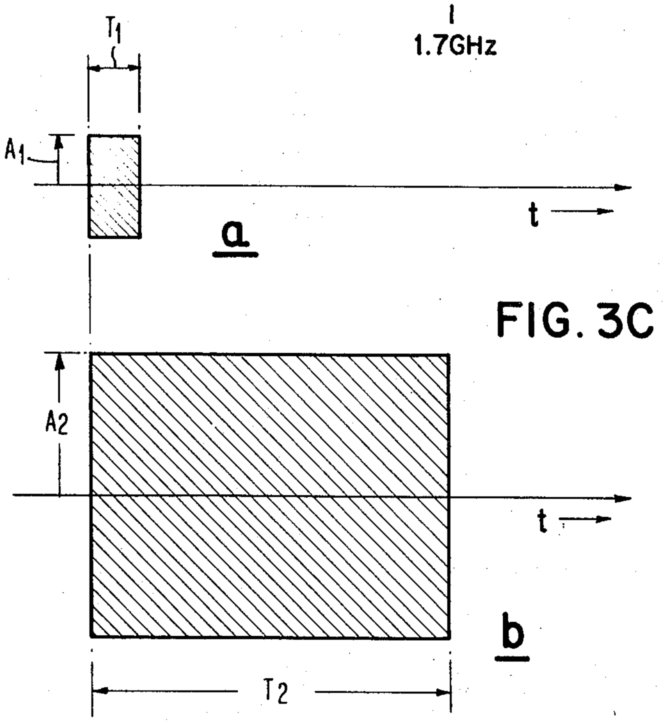
FIG. 3C
INVENTOR
PAUL L. FLEMING
BY Bernard H. Wiener
ATTORNEY

FREQUENCY MEMORY USING A GUNN-EFFECT DEVICE IN A FEEDBACK LOOP

Filed Aug. 1, 1968 4 Sheets-Sheet 2

FIG. 4A
PRIOR ART
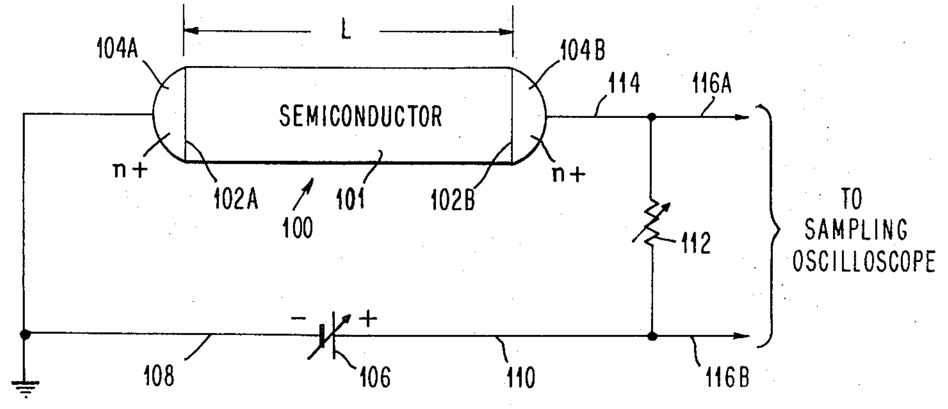
FIG. 4B
PRIOR ART
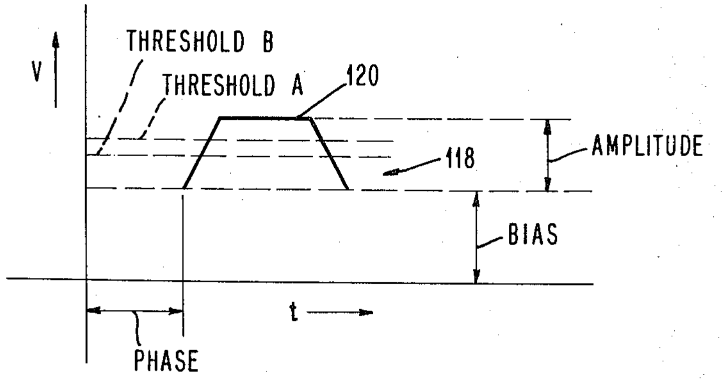
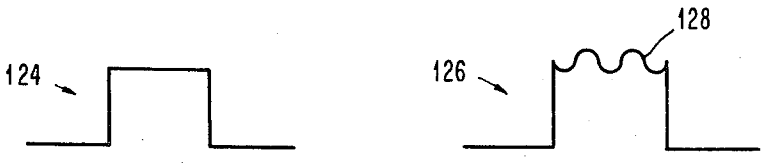
PRIOR ART
FIG. 4C
PRIOR ART
FIG. 4D United States Patent Office 3,521,243
Patented July 21, 1970

3,521,243

FREQUENCY MEMORY USING A GUNN-EFFECT DEVICE IN A FEEDBACK LOOP

Paul L. Fleming, Peekskill, N.Y., assignor to International Business Machines Corporation, Armonk, N.Y., a corporation of New York Filed Aug. 1, 1968, Ser. No. 749,361
Int. Cl. G11c *27/00*
U.S. Cl. 340—173 3 Claims

ABSTRACT OF THE DISCLOSURE

This disclosure provides a frequency memory for a received electromagnetic wave. The frequency memory includes a Gunn-effect device in a feedback loop to provide for functions of amplifying, limiting, and expanding a portion of the received wave. The feedback loop includes its inherent delay and a tunable delay provided by a phase shifter. The frequency of the received wave is recorded with respect to a particular natural mode of the feedback loop, i.e., the mode which overlaps the received frequency.

BACKGROUND OF THE INVENTION

This invention relates generally to a frequency memory, and it relates particularly to a frequency memory which uses a Gunn-effect device for amplifying, limiting, and expanding a received electromagnetic wave.

It has been demonstrated by P. L. Fleming, "Synchronization of Microwave Oscillations in GaAs," I.E.E.E. Proceedings, October 1965, pp. 1665–1666, that domain nucleation can be triggered by an external radio frequency signal when a Gunn-effect device is biased just below threshold. The gain obtained was observed on a pulsed basis. In addition, it has been demonstrated by J. B. Gunn, "Effect of Domain and Circuit Properties on Oscilations in GaAs," IBM Journal of Research and Development, vol. 10, July 1966, that biased above threshold, the resonance of the external circuitry (including susceptance contributions from the sample) can control the frequency of the Gunn-effect device over a wide frequency range.

A background prior art article on frequency memory is "Frequency Memory in Multi-Mode Oscillators," by W. A. Edson, I.R.E. Transactions—Circuit Theory, March 1965, pp. 58 to 66.

PRIOR ART GUNN EFFECT

An electrical shock wave microwave oscillator utilizes an electrical shock wave device coupled to a microwave transmission line or to a microwave cavity. The electrical shock wave device is a monocrystalline compound semiconductor, e.g., n-type GaAs or InP. If an electric field having a magnitude above a particular threshold is applied across the crystalline region of an electrical shock wave device, a current fluctuation is produced in a load circuit coupled thereto. The current fluctuation has been determined theoretically to originate from hot electrons which group in the semiconductor crystal under influence of the electric field and give rise transiently to an electrical shock wave, termed the Gunn effect, that propagates between the terminals of the crystalline region. The initiation of an electrical shock wave is sometimes referred to as the nucleation of a domain. Theoretical considerations indicate that the Gunn effect arises from a transfer of conduction electrons in a semiconductor from a central energy minima to an adjacent energy maxima where they have lower mobility. An electrical shock wave device includes a circuit wherein electrical shock wave propagation occurs in a semiconductor region. During activation of an electrical shock wave device, there is a nonuniform field distribution in a semiconductor region which move in space as time proceeds. It is this movement of a high field region which traverses the semiconductor region from cathode to anode and is reinitiated at the cathode that provides repetitious electrical shock wave propagation. There occurs a change in the current in the circuit of the electrical shock wave device related to the electrical shock wave propagation in the semiconductor region.

The electrical shock wave propagation is a transient localized space charge distribution that traverses the region in the presence of a sufficiently intense electric field gradient. In order for the localized space charge distribution to occur in the semiconductor region, it is required that there be present a sufficient density of conduction electrons and an inhomogeneity in the electric field. The normal density, i.e., the equilibrium density of conduction electrons in a semiconductor region of an electrical shock wave device is descriptive of the n-type charge carriers available for current at a particular temperature due to the crystalline structure and dopant concentration of the semiconductor region.

The original electrical shock wave device, now termed the Gunn-effect device, is presented in U.S. Pat. No. 3,365,583, filed June 12, 1964 and issued Jan. 23, 1968 by J. B. Gunn, and assigned to the assignee hereof. Illustrative background articles which describe prior art electrical shock wave devices are: "Instabilities of Current in III–V Semiconductors," by J. B. Gunn, IBM Journal of Research and Development, April 1964, pages 141 to 159; "The Gunn Effect," by J. B. Gunn, Journal of International Science and Technology, October 1965, pages 43 to 56; "Continuous Microwave Oscillations of Current in GaAs," by N. Braslau, et al., IBM Journal of Research and Development, November 1964, pages 545 and 546; and "Synchronized Non-Reciprocal GaAs Oscillator Circuit," by P. L. Fleming, IBM Technical Disclosure Bulletin, August 1965, page 415.

It has been demonstrated in the practice of the prior art that electrical shock wave propagation can be supported in a semiconductor region of either GaAs or InP. These materials are presumed to be exemplary of many semiconductor regions within which electrical shock wave propagation can be established. An energized electrical shock wave device provides output current pulses whose initiation and character are accurately related to the nature and duration of the input voltage pulse, i.e., the sequence of electrical shock waves generated in the semiconductor region is accurately dependent on the starting time and shape of the triggering or driving pulse. Thus, for an input pulse which is repeated identically in a train of voltage pulses, the output current wave from the electrical shock wave microwave oscillator is repeated identically in both shape and phase relative to each identical member of the input train of voltage pulses. In the operation of the prior art electrical shock wave device, as described in the noted U.S. patent and articles, the output current oscillation is a series of individual oscillatory pulses. If the triggering pulse is so long in duration as effective to be direct voltage, the microwave oscillations is continuous wave.

OBJECTS OF THE INVENTION

It is an object of this invention to provide a frequency memory for an electromagnetic wave.

It is another object of this invention to provide a frequency memory for an electromagnetic wave which includes circuitry for amplifying, limiting, expanding, and delaying the received wave.

It is another object of this invention to provide a frequency memory for an electromagnetic wave which utilizes a Gunn-effect device as an active element.

It is another object of this invention to provide the foregoing frequency memory wherein the Gunn-effect device provides the functions of amplifying, limiting, and expanding the received wave.

It is another object of this invention to provide a frequency memory for an electromagnetic wave which includes a Gunn-effect device as the active element in a feedback loop for amplifying, limiting, and expanding the received wave and a phase shifter device in the loop to obtain a variable delay for tuning the mode response of the frequency memory.

SUMMARY OF THE INVENTION

The practice of this invention utilizes a Gunn-effect device as an active element in a frequency memory loop. The loop also contains an inherent delay and a variable delay. The Gunn-effect device performs the functions of amplifying, limiting, and expanding a received electromagnetic wave.

For input signals with power less than a certain power threshold, the gain is less than unity and the frequency memory loop does not oscillate on noise thus providing expander action. If a signal is read in which exceeds the power threshold $P_T$, then gain is obtained and stable oscillations can be maintained. A Gunn-effect device is included as an active element in the loop. If the Gunn-effect device is the only nonlinear device in the loop, it also provides limiting. Since the Gunn-effect device responds relatively instantaneously to an input signal, the read-in signal is maintained for a loop propagation time and then removed, allowing the oscillating loop to remember its input. This oscillation can be continuously read out. The basic requirements of amplifying, limiting, and expanding of a received wave are provided by a Gunn-effect circuit.

A phase shifter which provides variable delay in the frequency memory loop is set so that the loop phase shift including the Gunn-effect circuit is $$Bl=\frac{2\pi l}{\lambda}=n2\pi$$

where B is the wave number and equals $2\pi/\lambda$; $\lambda$ is the wavelength of a signal in the line; and $l$ is the length of the line. An operating point is selected for the memory loop where the reciprocal of the loop loss equals the loop gain. The memory loop can be quenched by lowering the bias voltage on the Gunn-effect device or by a transmission device which modulates the loop loss.

The foregoing and other objects, features, and advantages of the invention will be apparent from the following more particular description of a preferred embodiment of the invention as illustrated in the accompanying drawings.

BRIEF DESCRIPTION OF THE DRAWINGS

FIG. 1 is a functional block diagram presenting the nature of the prior art frequency memory.

FIG. 2 is a functional block diagram presenting the nature of a frequency memory in accordance with the principles of this invention.

FIG. 3B is a waveform illustrating the discrete modes of operation of the embodiment of FIG. 3A.

FIG. 3C is an idealized waveform illustrating the tuning and operation of the embodiment of FIG. 3A as viewed by a sampling oscilloscope connected to the output.

FIG. 4A is a schematic circuit diagram used for explaining the general nature of the prior art Gunn-effect device.

FIG. 4B is a line diagram characterizing several pertinent parameters of an input voltage pulse applied across the semiconductor region of FIG. 4A for establishing a requisite electric field therein.

FIGS. 4C and 4D are line diagrams illustrative of current waveforms prior to and after the onset of electrical shock wave propagation in the semiconductor region of FIG. 4A.

DESCRIPTION OF THE EMBODIMENT

Figure 3A:
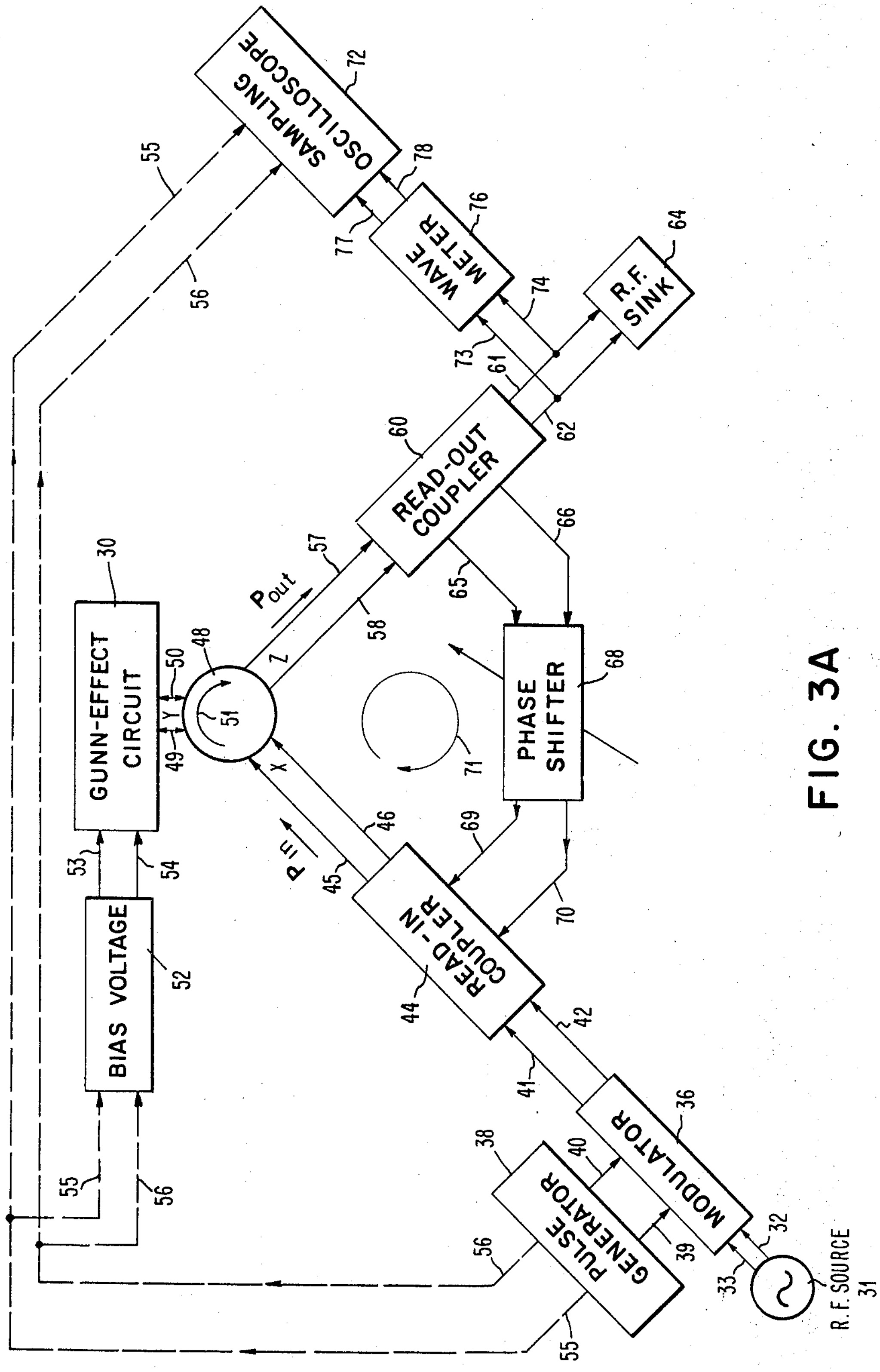
FIG. 3A presents a block diagram of an embodiment of this invention illustrating the use of a Gunn-effect device for amplifying, limiting, and expanding a received electromagnetic wave.

The nature and operation of an embodiment of this invention will first be explained with reference to FIGS. 1, 2, and 3, of which FIG. 1 is a functional block diagram of the prior art practice, FIG. 2 is a functional block diagram of the practice of this invention, and FIG. 3A is a block diagram of a frequency memory of this invention with associated FIG. 3B being the frequency mode response of the memory, and FIG. 3C being an illustrative output on a sampling oscilloscope showing the timing for the memory.

In the functional block diagram of the prior art shown in FIG. 1, an electromagnetic wave 10A is applied to the input terminal 12A of amplifier 14A. Amplifier 14A is connected via line 16A to limiter 18A whose output is connected via line 20A to delay 22A. The delay 22A provides a delay time $\tau$ to the input waveform 10A, and its output is connected via feedback line 24A to amplifier 14A. The output from the block diagram of FIG. 1 is taken at output terminal 26. The circuit of FIG. 1 when energized from rest builds up from noise and supports many modes separated in frequency by $1/\tau$ ($\tau$=loop delay). With reference to FIG. 1, the function of the amplifier 14A is to provide a transmission gain which exceeds the propagation loss in the loop. The function of the limiter 18A is to provide amplitude discrimination over the bandwidth of the frequency memory. The function of the delay 22A is to set the modal properties of the loop. Collectively, these functions form a traveling wave oscillator having discrete modes separated in frequency by $\tau^{-1}$. The discrete frequencies are given by $$f_n=nc/l$$

where $c$=velocity of light ($3\times10^8$ m./sec.)
$n$=mode number
$l$=length of loop.

Information is read into the loop by injecting a strong signal at input terminal 12A while the system is already energized or by injecting a relatively weak signal when the system is energized from rest.

The general practice of this invention will now be described with reference to FIG. 2 which presents a functional block diagram of a frequency memory in accordance with the principles of this invention. The received electromagnetic wave 10B is applied to the input terminal of amplifier 14B whose output is communicated via line 16B to limiter 18B. The output from limiter 18B is communicated via line 20B through expander 21B to variable delay 22B via line 23B. Finally, the output from variable delay 22B is communicated via feedback line 24B to amplifier 14B whose output is presented on terminal 26B. The function of the amplifier 14B is to provide transmission gain for signals 10B. The limiter 18B determines the saturation characteristic for signals which build up in the loop. The function of expander 21B is to provide higher transmission gain for signals exceeding a certain threshold level and to provide transmission loss for signals which do not exceed the threshold level. The expander 21B prevents the modes from building up on noise, and only input signals exceeding a threshold level will be stored in the loop. The stored input signals correspond to the loop modes. The variable delay 22B consists of a fixed delay inherent in the loop plus a tunable delay such as is provided by various types of radiofrequency phase shifters. The variable part of delay 22B provides a means for fine tuning of the frequency modes in the loop so that the received wave can correspond to a natural mode in the loop. Electronically tuning this variable phase shift provides the means for obtaining frequency agility in the loop, i.e., the ability of the loop to respond over a range of possible input frequencies. Information is read into the loop of FIG. 2 by injecting a signal at input terminal 12B which exceeds the threshold level in the loop. It has been discovered for the practice of this invention that a Gunn-effect device provides the functions of amplifying as by amplifier 14B, limiting as by limiter 18B, and expanding as by expander 21B for a received wave. This will be described in greater detail with reference to the transfer characteristic of FIG. 5B for the Gunn-effect circuit of FIG. 5A.

The general nature of an embodiment of this invention will be presented with reference to FIG. 3A which shows a block diagram of a frequency memory according to the principle of this invention including a Gunn-effect device as the active element thereof. A Gunn-effect circuit 30 provides the functions of amplifying, limiting, and expanding an electromagnetic wave which originally is applied to input lines 32 and 33 from a radiofrequency source 31. The electromagnetic wave is applied via input lines 32 and 33 to modulator 36 which is controlled by pulse generator 38 via lines 39 and 40. Pulse generator 38 and modulator 36 provide a rectangularly modulated electromagnetic wave via lines 41 and 42 to read-in coupler 44. Read-in coupler 44 is a microwave coupler for the electromagnetic wave to provide the power input via lines 45 and 46 to circulator 48. Circulator 48 may be a conventional three-port circulator having an input port *x*, an output port *z*, and an intermediate port *y*. Circulator 48 separates the input and output of the Gunn-effect circuit 30 and connects the *x* port to the *z* port via the *y* port for the described direction of propagation shown by the arrow 51 on circulator 48. Circulator 48 is connected at its *y* port via lines 49 and 50 to Gunn-effect circuit 30. Gunn-effect circuit 30 is established for operation by a bias voltage 52 connected via lines 53 and 54 to Gunn-effect circuit 30. The timing of the bias voltage 52 is controlled by pulse generator 38 on lines 55 and 56. The output from circulator 48 is connected via lines 57 and 58 to read-out coupler 60.

Read-out coupler 60 provides the output from the frequency memory of FIG. 3A on lines 61 and 62 to the radio-frequency sink 64. The memory delay loop of FIG. 3A identified by arrow 71 which shows direction of propagation includes the output of read-out coupler 60 connected via lines 65 and 66 to phase shifter 68. Phase shifter 68 provides for tuning the frequency memory of FIG. 3A by introducing a variable delay in the delay loop including the circulator 48, read-out coupler 60, phase shifter 68, and read-in coupler 44. Phase shifter 68 introduces an incremental delay to the normally occurring delay in the delay loop. To the extent required in an operational circumstance, an additional delay may be conveniently introduced into the loop. Phase shifter 68 communicates via lines 69 and 70 with read-in coupler 44. Read-out coupler 60 is connected via lines 73 and 74, wave meter 76, and lines 77 and 78 to sampling oscilloscope 72. Sampling oscilloscope 72 is timed by pulse generator 38 via lines 55 and 56.

The waveform presented in FIG. 3B is a replica of a trace observed on a conventional oscilloscope, not shown; and the waveforms presented in FIG. 3C are idealized versions of traces on sampling oscilloscope 72.

Other details of FIG. 3A will be described with reference to FIGS. 3B and 3C. FIG. 3B shows the power transmission of the loop when Gunn-effect device of the Gunn-effect circuit 30 (Gunn-effect device 150 of FIG. 5A) is short circuited. To obtain display of FIG. 3B, a frequency swept signal is introduced at the input of the read-in coupler 44 while a conventional crystal detector, not shown, is placed at the output of read-out coupler 60.

An N*l* product of $10^{13}$ (where N is the electrons/$cm.^3$ and *l* is the length in cm.) assures well-defined domain formation in a Gunn-effect device with a transit time frequency of 2.0 gHz., where gHz. represents gigahertz. When operated in the under voltage resonant mode with a drive of ~20 volts, such a device typically delivers one watt of radiofrequency peak power. In the frequency memory of FIG. 3A, the device is operated just below threshold. FIG. 3B shows the modes for which the loop phase shift is $n2\pi$ in the range of 1.7 gHz. to 2.0 gHz.

FIGS. 3C–*a* and 3C–*b* present idealized sampling oscilloscope waveforms under specific operating conditions. FIG. 3C–*a* shows the signal displayed on sampling oscilloscope 72 when the Gunn-effect circuit 30 is not energized and the display is a replica of the read-in waveform at frequency $f_0$. The time $T_1$ is slightly longer than a loop 71 propagation time. FIG. 3C–*b* is a display of the memory loop output with the Gunn-effect circuit 30 energized below threshold. The time $T_2$ is equal to time for which the Gunn-effect circuit 30 is energized. The time $T_2-T_1$ indicates the duration of the memory action under these conditions. Wavemeter 76 is used to measure the frequency of the respective waveforms. The time $T_2$ is illustratively 4.0 microseconds, and individual radio-frequency cycles are not discernable on this time scale. The ratio $A_2/A_1$ for the amplitudes of the waveforms in FIGS. 3C–*a* and 3C–*b* is indicative of the gain obtained from the Gunn-effect circuit 30.

Another aspect of interest is the provision of frequency agility which is provided by electronically tuning the phase shift in the loop by variable phase shifter 68. The loop condition for oscillation becomes $$2\pi L/\lambda+\phi(v)=N2\pi$$

where

L=length of memory loop 71,
λ=wavelength of received wave,
$\phi(v)$=voltage variable phase shift,
N=frequency mode number.

For an air equivalent loop 71 length of 12″, an illustrative calculation is made on the frequency agility of the loop by assuming 180° variation in the phase shifter independent of frequency. The calculated results are:

| Mode No. | Loop tunability range | Tuning bandwidth |
|---|---|---|
| $n=1$ | 0.5 to 1.0 gHz. | 66% centered at .75 gHz. |
| $n=2$ | 1.5 to 2.0 gHz. | 28.8% centered at 1.75 gHz. |
| $n=3$ | 2.5 to 3.0 gHz. | 18.2% centered at 2.75 gHz. |

These calculations are illustrative of the frequency agility obtainable by the practice of this invention.

PRIOR ART GUNN-EFFECT DEVICE

With reference to FIG. 4A, a prior art electrical shock wave device 100 has a semiconductor crystalline region 101 preferably monocrystalline GaAs or InP, having an active length *l* between faces 102A and 102B. Ohmic $n^+$ contacts 104A and 104B are established on semiconductor faces 102A and 102B, respectively. Electrical connections are made to the ohmic $n^+$ contacts in circuit relationship to variable voltage source 106. Voltage source 106 has its negative terminal connected via conductor 108 to contact 104A, and has its positive terminal connected via a path consisting of conductor 110, load resistor 112, and conductor 114 to contact 104B. A measure of the current load resistor 112 is obtained via conductors 116A and 116B connected, respectively, to conductors 114 and 110 for presentation of a replica of the voltage drop therein on the display tube face of a sampling oscilloscope, not shown.

The semiconductor region 101 may be monocrystalline GaAs or InP with an n-type doping concentration, i.e., normal equilibrium density of conduction electrons, sufficient to permit electrical shock wave propagation therein. An electrical shock wave is a localized space charge distribution in semiconductor region 101 which is initiated contiguous to contact 104A and propagates across the length L of region 101 to contact 104B. It arises concomitantly with a local inhomogeneity in an electric field established between contacts 104A and 104B by voltage source 106 provided the electric field is initially at least to a certain threshold level A shown in FIG. 4B.

The electrical shock wave initiated at cathode 104A continues to propagate across the semiconductor region 101 provided that the electric field is maintained at least to the level obtained by the application of a voltage threshold level B. In FIG. 4B an additional bias level is indicated representative of a constant voltage applied across semiconductor region 101 to which the voltage level 120 of pulse 118 is added. Except for power dissipation limitations, the voltage level 120 may be continuously applied across the semiconductor region 100.

FIGS. 4C and 4D are idealized current waveforms useful for explaining the relationship between current in semiconductor region 101 and the voltage applied between contacts 104A and 104B. Under the assumption that voltage pulse 118 has an upper voltage level 120 less than threshold level A, the current in load 112 as represented on the display tube face of a sampling oscilloscope, not shown, is that of FIG. 4C. It is noted that the current waveform 124 of FIG. 4C is comparable in shape to voltage pulse 118 of FIG. 4B. When the upper level 120 of voltage pulse 118 exceeds that of threshold level A, a localized space charge distribution is initiated near contact 104A and propagates toward contact 104B. The concomitant change in current is repeated for each electrical shock wave launched from contact 104A. There is illustrated in FIG. 4D an exemplary current waveform 126 having a high frequency oscillation 128 which exists during the time interval that a voltage pulse 118 whose upper level 120 is maintained above threshold level B is applied across semiconductor region 101.

POWER TRANSFER CHARACTERISTIC OF GUNN-EFFECT DEVICE

Figures 5A, 5B:
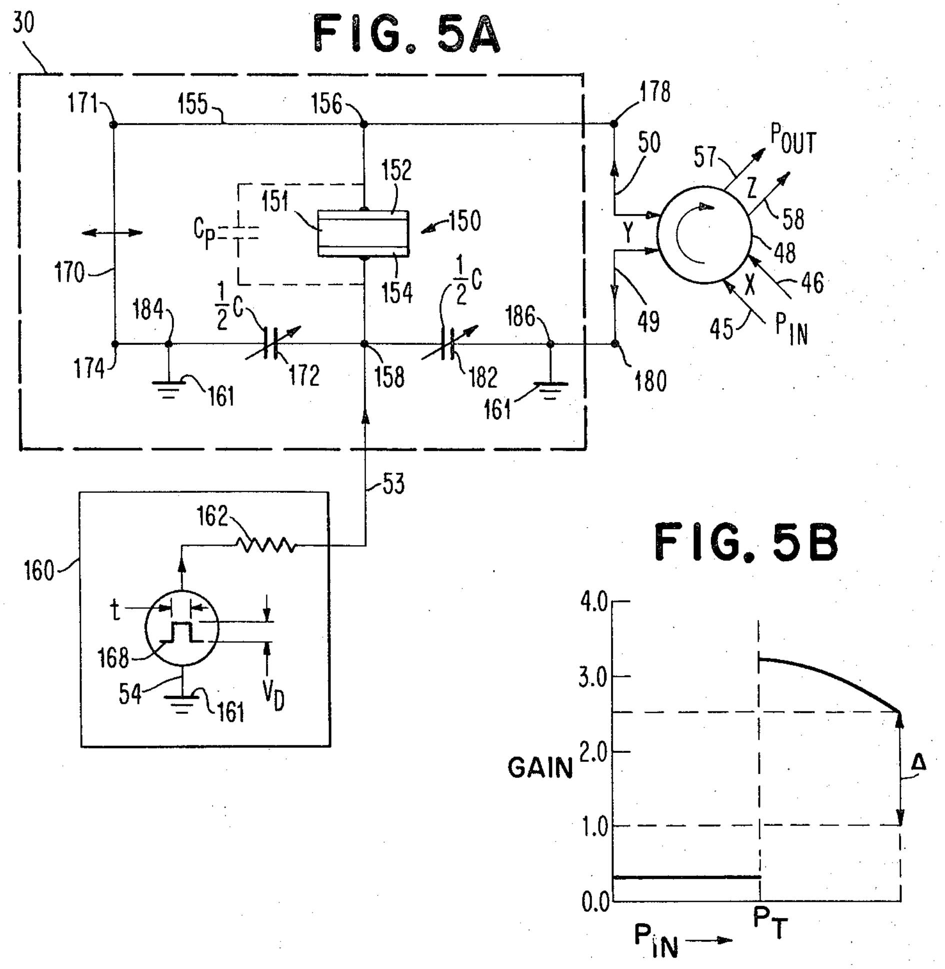
FIG. 5A is a schematic circuit diagram of a Gunn-effect circuit useful for the embodiment of FIG. 3A.
FIG. 5B presents data on the power transfer characteristic for the circuit of FIG. 5A.

The Gunn-effect circuit 30 of FIG. 3A is shown in greater detail in FIG. 5A where provision for tuning the resonant mode is provided by sliding short-circuit element 170. The main interest of this section is in the power transfer characteristics between input port $x$ and output port $z$ of circulator 48 when the Gunn-effect device 150 is biased just below threshold. The power transfer characteristic of FIG. 5B is deduced for the practice of this invention by the following considerations. Consider an input sinusoid introduced at the $x$ port superimposed on the bias voltage of the Gunn-effect device 150. Due to the finite offset between the bias voltage and the threshold voltage, there will be a range of input signals which will not trigger domain nucleation in the Gunn-effect device 150. These signals have power less than the threshold power $P_T$. For these signals, the Gunn-effect device 150 represents a passive termination; and the transfer gain will be less than unity. The highest transfer gain will be obtained by input signals slightly larger than $P_T$, since they represent the minimum input power required to trigger domain nucleation in the Gunn-effect device 150. Increasing the signal substantially above $P_T$ will result in a decreasing gain, and the Gunn-effect circuit 30 will effectively limit larger input signals. By inspection of FIG. 5B, it is observed that the amplification is provided for signal power which exceeds $P_T$. Expanding is provided, as there is insertion loss for signal power less than $P_T$. Large signal limiting is provided, since there is a decreasing gain as signal power increases above $P_T$. The symbol $\Delta$ in FIG. 5B represents the excess gain provided by Gunn-effect circuit 30 for a typical operating point where the gain equals the reciprocal of the memory loop 71 (FIG. 3A) transmission loss.

Figure 5C:
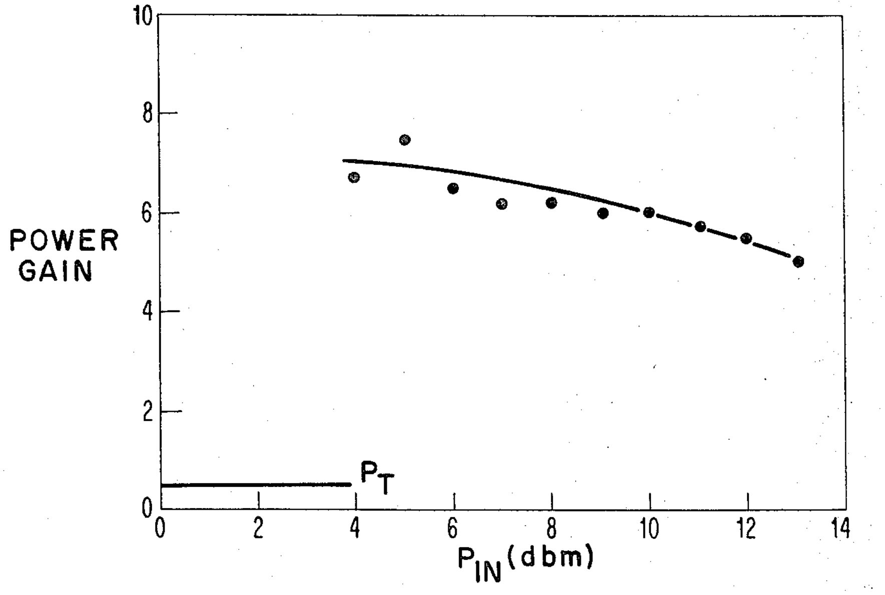
FIG. 5C is a line diagram presenting an experimental power transfer characteristic for the circuit of FIG. 5A.

The experimental verification of the power transfer characteristic of FIG. 5B is contained in FIG. 5C. The data represents the power transfer characteristic of a Gunn-effect circuit 30 where the N$l$ product is large enough for well-defined domain nucleation in Gunn-effect device 150. For input signals less than $P_T$ at port $x$ of circulator 48, a constant transfer gain less than unity is shown. For signals greater than $P_T$, gain is obtained. The experimental points show the nature of the amplifying, limiting, and expanding of the Gunn-effect circuit 30 for a received electromagnetic wave.

In greater detail FIG. 5A presents a schematic circuit diagram illustrating the connection of an electrical shock wave or Gunn-effect device in a microwave transmission line 155 with drive terminal 158. An electrical shock wave device 150 has a semiconductor region 151 with ohmic contacts 152 and 154 thereon. It is connected to transmission line 155 at points 156 and 158. Connection point 158 is the drive terminal at which is applied a voltage level for initiating electrical shock wave propagation in electrical shock wave device 150. A pulse generator 160 having an internal resistance 162 is connected via connection lines 53 and 54 to drive terminal 158. Pulse generator 160 represents the pulse generator 38, connection lines 55 and 56, and bias voltage 52 of FIG. 3A. Pulse generator 160 may conveniently utilize a conventional emitter-follower transistor circuit driven by a conventional pulse source, not shown. Pulse generator 160 is grounded at point 161 and provides a rectangular pulse 163 with a time duration $t$ and a voltage level $V_D$. Pulse generator 160 may provide a continuous voltage level for another exemplary operation of the embodiment of FIG. 3A. Connection point 156, to which contact 152 of electrical shock wave 150 is affixed, is connected by transmission line 155 to movable microwave-frequency short 170. The remaining circuit connections include circulator 48 connected to transmission line 155 at connection points 178 and 180 which is the impedance presented to the Gunn-effect circuit 30. Movable microwave-frequency short 170 is positioned in transmission line 154 in tuned relationship with Gunn-device 150.

Drive terminal 158 of electrical shock wave device 150 is connected via capacitance 182 and transmission line 155 to connection point 180. Additionally, transmission line 155 is connected to ground 161 at connection points 184 and 186 between capacitance 172 and microwave-frequency short 170 and between capacitance 182 and circulator 48. Connection lines 49 and 50 connect Gunn-effect circuit 30 to circulator 48 of FIG. 3A.

The construction of an exemplary physical structure for implementing the Gunn-effect circuit 30 of FIG. 5A will now be described. Electrical shock wave device 150 is mounted in a symmetrical strip transmission line 155. The strip transmission mount includes a movable short 170, radio-frequency by-pass capacitors 172 and 182, ground terminal 161, drive terminal 158, and transition from strip transmission line 154 to a coaxial line, not shown. Pulse generator 160 comprises an emitter-follower circuit, not shown, driven by a conventional pulse generator, not shown.

EXPERIMENTS FOR THE INVENTION

This section presents illustrative experimental data verifying the practice of the invention for the embodiment of FIG. 3A. The illustrative frequency memory had strong frequency responses corresponding to mode numbers $n=18$ and $n=19$. The swept response of the frequency memory is illustrated in FIG. 3B over the frequency range of 1.7 to 2.0 gigahertz. The memory action is illustrated in FIG. 3C. The measurements are summarized as follows:

| Mode No. | Measured frequency | Input frequency |
|---|---|---|
| $n=18$ | 1,873.5 mHz. | 1,875.5 mHz. |
| $n=19$ | 1,977.5 mHz. | 1,979.5 mHz. |

The measured frequency was determined at the end of the readout pulse in FIG. 3C–*b* while the input frequency corresponds to the read-in pulse in FIG. 3C–*a*.

SUMMARY OF THE INVENTION

In summary, the practice of this invention provides an electromagnetic wave of a given frequency delayed in time from another electromagnetic wave of the same frequency. Apparatus for the practice of the invention effects regenerating of electromagnetic energy after a received electromagnetic wave of the given frequency causes a Gunn-effect device to generate an electromagnetic wave at that frequency. Subsequently, the stored electromagnetic energy in a memory delay loop connecting the input and output of a Gunn-effect circuit causes the Gunn-effect circuit to regenerate continuously an electromagnetic wave at a natural frequency mode of the delay loop. The Gunn-effect device is coupled nonreciprocally via a circulator in the delay loop. By incorporating a variable phase shifter in the memory loop, variable tuning of the frequency modes is achieved. By causing the phase shifter to be electronically variable, frequency agility is achieved for input electromagnetic waves having a range of frequencies.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A frequency memory for an electromagnetic wave comprising:

an input terminal adapted to receive an electromagnetic wave of a given frequency;

pulse modulation means for modulating said electromagnetic wave;

a read-in coupler adapted to receive said modulated wave;

a circulator having first, second, and third ports, said first port of said circulator being adapted to receive said modulated wave from said read-in coupler, said first port and said third port being coupled nonreciprocally;

a Gunn-effect device means connected to said second port of said circulator for amplifying, limiting, and expanding electromagnetic energy to regenerate another electromagnetic wave of said given frequency;

a bias voltage connected to said Gunn-effect device to bias it below threshold voltage;

a read-out coupler connected to said third port of said circulator to read out said regenerated wave;

a closed electromagnetic loop including said read-in coupler, said circulator, said Gunn-effect device means, and said read-out coupler; and a pulse generator connected to said bias voltage for timing thereof.

2. The memory of claim 1 which further includes a sampling oscilloscope connected to said read-out coupler and timed by said pulse generator for displaying said regenerated wave from said read-out coupler.

3. A circulator loop for storing the frequency of an input signal comprising:

(a) a bulk semiconductor device connected in the loop and including a body of single conductivity type semiconductor material having ohmic contacts on opposite ends of the body;

(b) the ($Nl$) product for the body, where $N$=excess carrier concentration and $l$=distance between the ohmic contacts, being above the minimum value at which the semiconductor device responds to an applied electric field above a threshold value by the production of high field domains which nucleate, propagate and are extinguished in the body;

(c) means for applying to said contacts a bias voltage below the threshold for domain nucleation;

(d) means connected in the loop for receiving an input signal and applying the input signal to said semiconductor device;

(e) said semiconductor device, each time the input signal raises the voltage across the semiconductor device above the threshold voltage, responding by the nucleation and propagation of a domain to produce a pulse which is applied to said loop;

(f) the frequency of said pulses applied to said loop being determined by the frequency of said input signal;

(g) and said loop including means for circulating said pulses around said loop back to said semiconductor device to store the frequency of the input signal.

References Cited

UNITED STATES PATENTS

| | | | |
|---|---|---|---|
| 2,601,289 | 6/1952 | Hollabaugh. | |
| 3,182,203 | 5/1965 | Miller ____________ | 333—1.1 X |
| 3,414,841 | 12/1968 | Copeland. | |
| 3,437,957 | 4/1969 | Ames ____________ | 333—1.1 X |

OTHER REFERENCES

Thim, Microwave Amplification in a DC-Biased Bulk Semiconductor, Applied Physics Letters, vol. 7, No. 6, Sept. 15, 1965, pp. 167–8.

TERRELL W. FEARS, Primary Examiner

H. L. BERNSTEIN, Assistant Examiner

U.S. Cl. X.R.

333—1.1; 331—107